Oct. 25, 1927.

C. P. PRICE

TIRE SPREADER

Filed May 31, 1927

1,647,054

C. P. Price
INVENTOR

BY Victor J. Evans
ATTORNEY

Patented Oct. 25, 1927.

1,647,054

UNITED STATES PATENT OFFICE.

CHESTER P. PRICE, OF SAN ANTONIO, TEXAS.

TIRE SPREADER.

Application filed May 31, 1927. Serial No. 195,451.

This invention relates to tools primarily adapted for spreading the beads of pneumatic tires apart.

An object of the invention comprehends a handle member so disposed as to permit the spreader to be most conveniently and effectively used.

Another object of the invention contemplates a cross bar carried by the handle member.

More specifically stated the handle and cross bar are provided with means upon the ends thereof and adapted to engage the beads of a tire when the device is called into use.

With the above and other objects in view, the invention further consists of the following novel features and details of construction to be hereinafter more fully described, illustrated in the accompanying drawing and pointed out in the appended claims.

Figure 1:
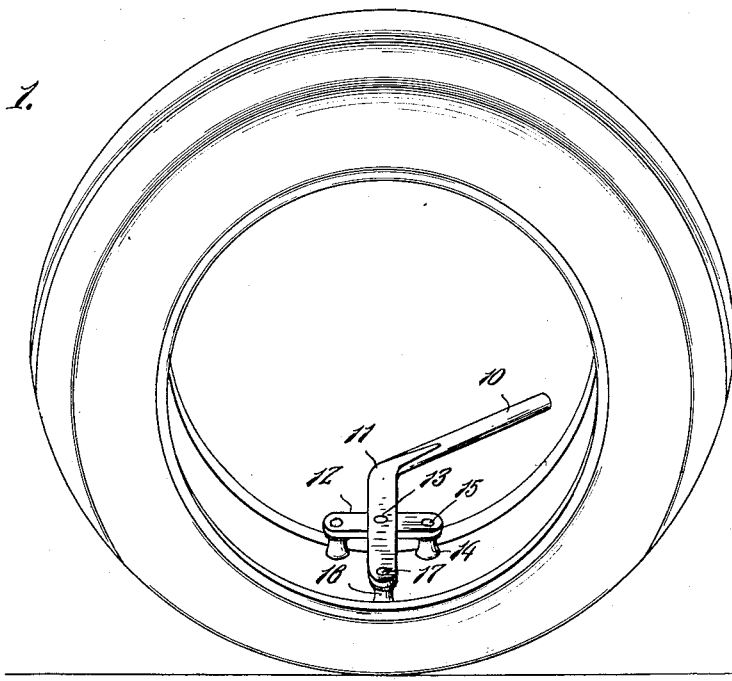
Figure 1 is a perspective of the invention as applied.

Referring to the drawing in detail, wherein like characters of reference denote corresponding parts, the reference character 10 indicates a handle member provided with a flattened portion 11 upon one end and extended at an inclination therefrom. A cross bar 12 is pivotally connected as at 13 upon the flattened portion 11. Grooved spool members 14 are rotatably mounted upon pins 15 depending from the cross bar 11 adjacent the extremities thereof. An elongated spool member 16 having the grooved portion thereof disposed in alignment with the grooved portions of the spools 14 is rotatably mounted as indicated at 17 upon the extremity of the flattened portion 11.

Figure 2:
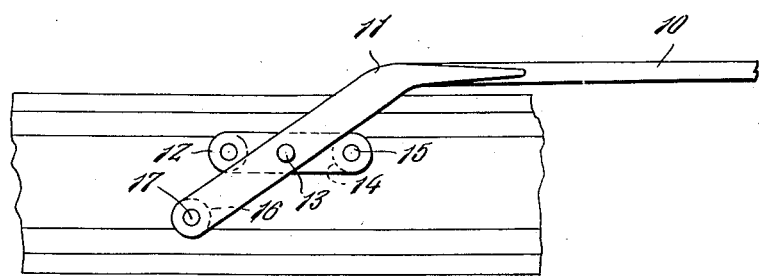
Figure 2 is a top plan view of the invention when initially applied.
Figure 3:
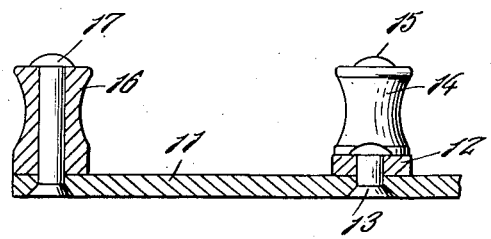
Figure 3 is a fragmentary longitudinal sectional view taken through the handle member and intersecting portion of the cross bar.

In the application of the invention the same is first disposed in position as illustrated in Figure 2 of the drawing. The handle member 10 is then shifted to the position as illustrated in Figure 1 of the drawing; such action will repose one bead within the grooved portions of the spools 14 while the spool 16 will be swung to occupy a position in spaced relation to the spool 14. The pivot pin 13 for the cross bar 12 also serves a similar purpose for the flattened portion 11 when the device is called into use. The grooves in the spools will prevent the device from becoming accidentally displaced due to the resiliency of the side walls of the tire. The spread of the beads may be regulated by the length of the flattened portion between the pivot pins 13 and 17 respectively. The peculiar offset for the flattened portion 11 of the handle member 10 obviates a great degree of trouble in the manipulation of the device in so far as the handle member is initially reposed upon the outer side of the tire casing.

The invention will prove of great value to vulcanizing shops, tire adjusters who inspect tires for wear or abuse; to the small tire or garage man who does tire repair work. This will be of great aid in locating breaks, nails or thorns that may have caused punctured tubes.

The invention will materially aid motorists in the repairing and changing of tires and especially upon new tires, the beads of which being relatively stiff and hard to push apart when inserting an inner-tube therein.

The invention is susceptible of various changes in its form, proportions and minor details of construction, and the right is herein reserved to make such changes as properly fall within the scope of the appended claims.

Having thus described the invention, what is claimed is:

1. A tire spreader comprising a handle member, a flattened portion formed as a continuation of and offset upon one end of the handle member, a cross bar carried upon the flattened portion, and means carried by the ends of the cross bar and flattened portion to spread the beads of a tire casing apart.

2. A tire spreader comprising a handle member provided with a flattened portion upon one end, a cross bar pivotally mounted upon the flattened portion, and spools carried by the flattened portion and cross bar.

3. A tire spreader comprising handle member provided with a flattened portion offset upon one end thereof, a cross bar pivotally mounted upon the flattened portion, and grooved spools rotatably mounted adjacent the ends of the flattened portion and cross bar adapted for engagement with the beads of a tire casing to hold the same apart when the handle member is shifted to an operative position.

In testimony whereof I affix my signature.

CHESTER P. PRICE.